(12) United States Patent
Toyama et al.

(10) Patent No.: US 8,714,330 B2
(45) Date of Patent: May 6, 2014

(54) ELECTROMAGNETIC CLUTCH APPARATUS

(75) Inventors: Daisuke Toyama, Anjo (JP); Takeshi Hashizume, Handa (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 1500 days.

(21) Appl. No.: 11/979,619

(22) Filed: Nov. 6, 2007

(65) Prior Publication Data

US 2008/0110717 A1 May 15, 2008

(30) Foreign Application Priority Data

Nov. 7, 2006 (JP) ................................. 2006-301985

(51) Int. Cl.
*F16D 27/06* (2006.01)
*F16D 27/14* (2006.01)
*G01B 7/30* (2006.01)

(52) U.S. Cl.
USPC ............... 192/84.951; 192/30 W; 324/207.25

(58) Field of Classification Search
USPC ........ 192/84.951, 84.9, 84.95, 84.961, 30 W; 377/89, 91; 324/179, 207.2, 207.25; 49/352, 360
See application file for complete search history.

(56) References Cited

U.S. PATENT DOCUMENTS

| | | | | |
|---|---|---|---|---|
| 434,382 | A | * | 8/1890 | Currie ........................... 192/84.5 |
| 5,410,226 | A | * | 4/1995 | Sekiguchi et al. ............ 318/266 |
| 2005/0055883 | A1 | | 3/2005 | Sato et al. |
| 2005/0183924 | A1 | * | 8/2005 | Fukumoto et al. ....... 192/84.961 |
| 2006/0112643 | A1 | * | 6/2006 | Yokomori et al. .............. 49/360 |
| 2006/0168891 | A1 | * | 8/2006 | Aoyama et al. ................. 49/360 |
| 2006/0225358 | A1 | * | 10/2006 | Haag et al. ...................... 49/360 |
| 2008/0000161 | A1 | * | 1/2008 | Nagai et al. ..................... 49/360 |
| 2008/0178529 | A1 | * | 7/2008 | Yoshida et al. ................. 49/352 |

FOREIGN PATENT DOCUMENTS

| | | |
|---|---|---|
| JP | 57-22423 A | 2/1982 |
| JP | 11-132256 A | 5/1999 |
| JP | 2001-041263 A | 2/2001 |
| JP | 2003-74255 A | 3/2003 |

(Continued)

OTHER PUBLICATIONS

Office Action dated May 26, 2011, issued by the Japanese Patent Office in corresponding Japanese Patent Application No. 2006-301985, and English language translation of the Office Action.

*Primary Examiner* — David D Le
*Assistant Examiner* — Terry Chau
(74) *Attorney, Agent, or Firm* — Buchanan Ingersoll & Rooney PC (57) ABSTRACT

An electromagnetic clutch apparatus includes: a rotational shaft rotatable for an input and output of a rotational driving force; a rotor integrally rotated with the rotational shaft about an axis and provided with a plurality of magnetic poles each having a first polarity and a second polarity being different from the first polarity, the first and second polarities of the magnetic poles being arranged alternately along a circumferential direction of the rotor; an armature supported to be rotatable relative to the rotor; a rotational member rotated for the one of the input and output of the rotational driving force relative to the armature; an exciting coil stored in the rotor and generating magnetic flux so that the rotor electromagnetically attracts the armature; and a magnetic flux detecting element arranged to face the magnetic poles along a direction of the axis so as to detect magnetic flux of the magnetic poles.

11 Claims, 5 Drawing Sheets

(56) References Cited

FOREIGN PATENT DOCUMENTS

| | | |
|---|---|---|
| JP | 2005-121105 A | 5/2005 |
| JP | 2005-265095 A | 9/2005 |
| JP | 2006-125452 A | 5/2006 |
| JP | 2007-46626 A | 2/2007 |

* cited by examiner

ELECTROMAGNETIC CLUTCH APPARATUS

CROSS REFERENCE TO RELATED APPLICATIONS

This application is based on and claims priority under 35 U.S.C. §119 to Japanese Patent Application 2006-301985, filed on Nov. 7, 2006, the entire content of which is incorporated herein by reference.

FIELD OF THE INVENTION

The present invention relates to an electromagnetic clutch apparatus. More particularly, the present invention pertains to an electromagnetic clutch apparatus, which includes a rotational shaft rotatable to implement one of an input and an output of a rotational driving force; a rotor integrally rotated with the rotational shaft about an axis and provided with magnetic poles having different polarity respectively arranged alternately along a circumferential direction of the rotor; an armature supported to be rotatable relative to the rotor; a rotational member rotated to implement the one of the input and the output of the rotational driving force relative to the armature; an exciting coil generating magnetic flux so that the rotor electromagnetically attracts the armature; and a magnetic flux detecting element to detect magnetic flux of the magnetic pole.

BACKGROUND

An electromagnetic clutch apparatus of this type is disclosed in JP2003-74255A (paragraphs 0022-0024, 0027-0029, and FIGS. 4 and 8). According to the electromagnetic clutch apparatus disclosed in JP2003-74255A, a rotational driving force is inputted to a wheel gear configuring a rotational member from a worm gear driven by a motor. Further, a rotational shaft is connected to a drum for winding a wire, which performs an opening operation and a closing operation of a sliding door for a vehicle. When an exciting coil is fed with electric current and an armature is electromagnetically attracted to a rotor, the rotational driving force of the motor is transmitted to the worm gear, the rotational member (wheel gear), the armature, the rotor, the rotational shaft, and the drum in sequence so that the opening operation and the closing operation of the sliding door is performed. When the feeding to the exciting coil is stopped and an attraction between the armature and the rotor is released, a connection among the rotor, the rotational shaft and the drum is released. On this occasion, the opening operation and the closing operation of the sliding door can manually be performed. Further, by means of a magnetic flux detecting element, a rotational direction and an amount of rotation can be monitored by detecting a variation in magnetic flux occurred from the magnetic poles. Accordingly, a determination of a position of the sliding door can be performed. Further, a determination of an open and close state of the sliding door can be also performed in a condition where the opening operation or the closing operation of the sliding door is performed with a speed over a predetermined speed.

Figure 6A:
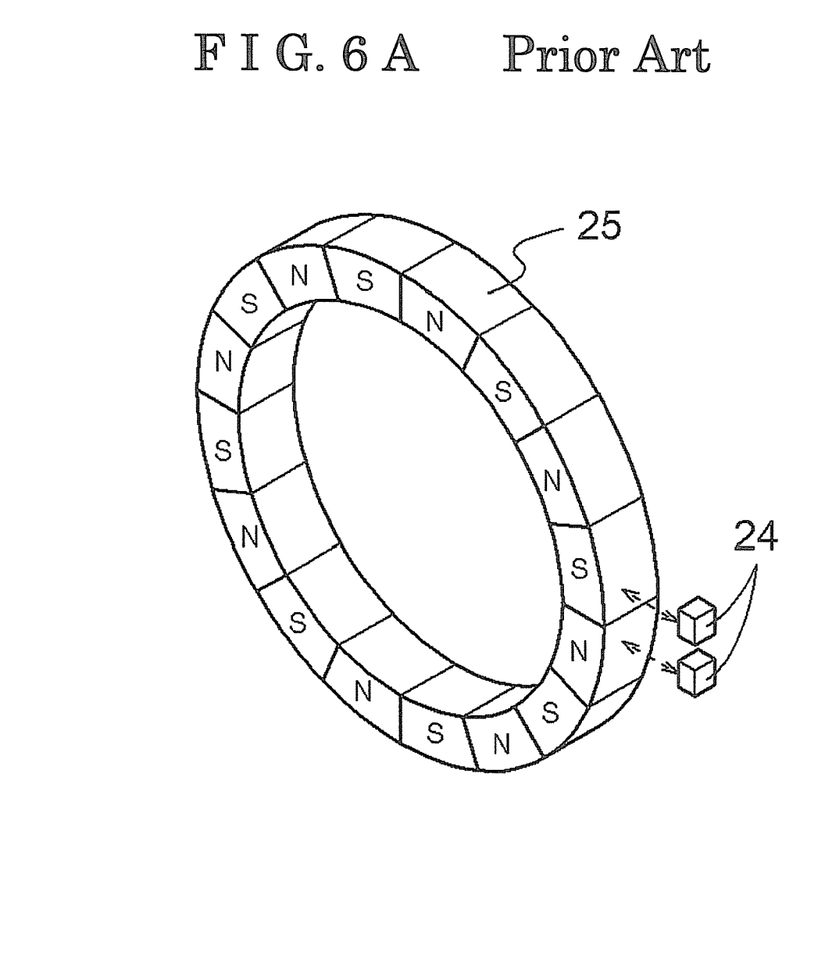
FIG. 6A is a schematic view showing a position of a hall element according to a conventional work.

However, according to the electromagnetic clutch apparatus disclosed in JP2003-74255A, because a core storing the exciting coil is separately assembled to the rotor attracting the armature, a step caused by an assembling is formed at the boundary of the core and the rotor. Therefore, an air gap occurs between the core and the rotor, and the magnetic flux may easily be leaked to the outside of a rotor main body of the rotor. Because an influence of leaked magnetic flux relative to the magnetic flux detecting element is particularly strong in an axial direction, the magnetic flux detecting element is required to be provided in a radial direction having smaller leaked magnetic flux as illustrated in FIG. 6A. Accordingly, a flexibility of an arrangement of the magnetic flux detecting element may be lowered. Further, in order to prevent the magnetic flux from leaking at the air gap between the rotor main body and the core, a control substrate and a substrate for the magnetic flux detecting element are separately configured. More specifically, the substrate for the magnetic flux detecting element is arranged in the radial direction of the rotor and is orthogonally assembled relative to the control substrate. Therefore a manufacturing cost of the electromagnetic clutch apparatus may be increased.

A need thus exists for an electromagnetic clutch apparatus, which is not susceptible to the drawback mentioned above.

SUMMARY OF THE INVENTION

According to an aspect of the present invention, an electromagnetic clutch apparatus includes: a rotational shaft rotatable to implement one of an input and an output of a rotational driving force; a rotor integrally rotated with the rotational shaft about an axis and provided with a plurality of magnetic poles each having a first polarity and a second polarity being different from the first polarity, the first and second polarities of the magnetic poles being arranged alternately along a circumferential direction of the rotor; an armature supported to be rotatable relative to the rotor; a rotational member rotated to implement the one of the input and the output of the rotational driving force relative to the armature; an exciting coil stored in the rotor and generating magnetic flux so that the rotor electromagnetically attracts the armature; and a magnetic flux detecting element arranged to face the magnetic poles along a direction of the axis so as to detect magnetic flux of the magnetic poles.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
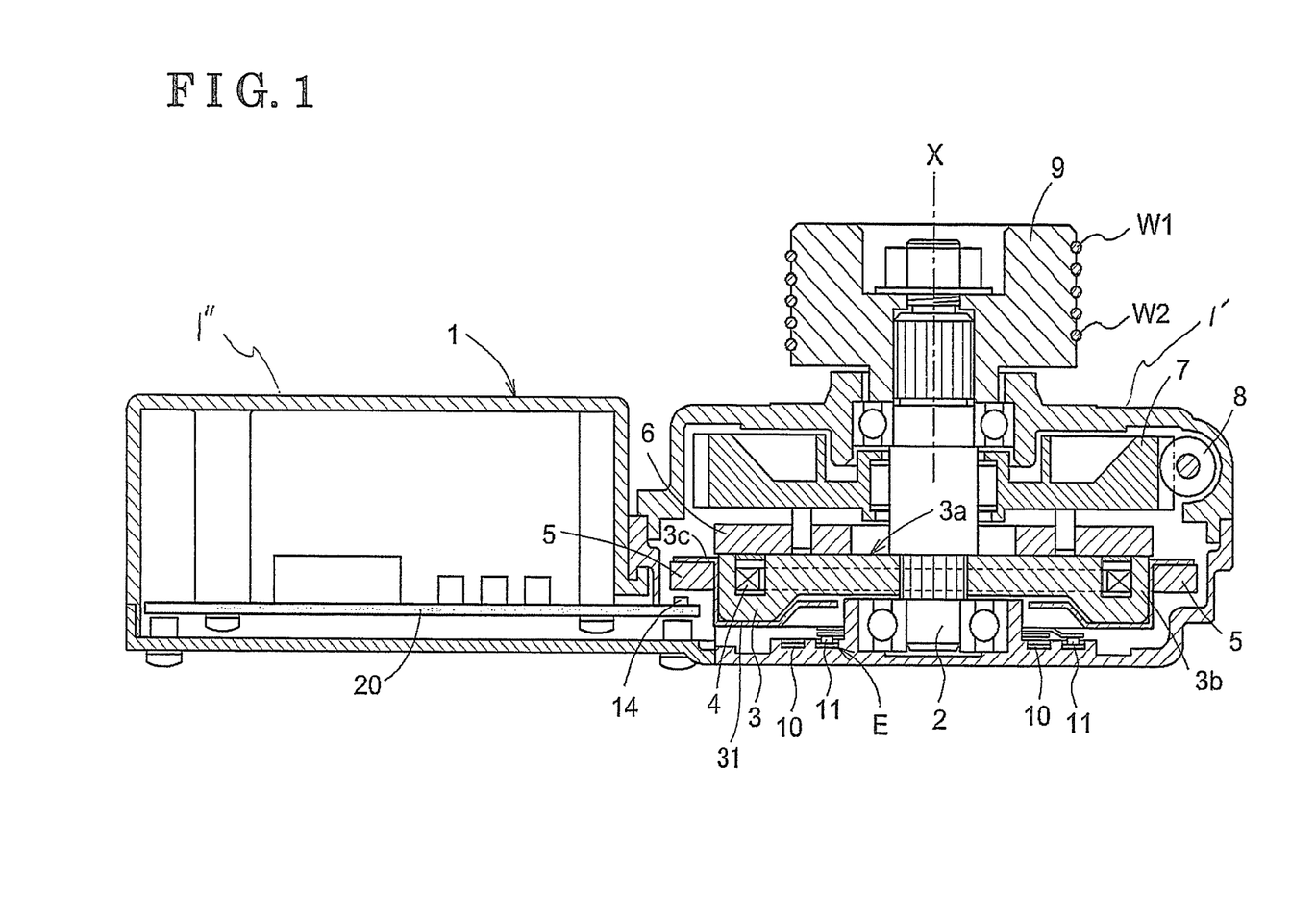
FIG. 1 is a broken side view of an electromagnetic clutch apparatus according to an embodiment of the present invention.

An embodiment of the present invention will be explained with reference to the attached drawings. FIG. 1 is a sectional view showing an example of an electromagnetic clutch apparatus applied to an opening and closing system of a sliding door for a vehicle. FIG. 1 shows a housing 1 having a first housing portion 1' and a second housing portion 1". The electromagnetic clutch apparatus includes a rotational shaft 2 rotatably supported by the housing 1 for implementing an input of a rotational driving force when rotating in one rotational direction, a rotor 3 (rotor main body) integrally rotated with the rotational shaft 2 about an axis X, an armature 6 rotatably supported so as to be rotatable relative to the rotor, a wheel gear 7 (an example of a rotational member) constantly and integrally rotated with the armature 6, and a worm gear 8 meshed with the wheel gear 7. The rotational shaft 2 implements an input of the rotational driving force when rotating in the one rotational direction and implements an output thereof when rotating in a reverse rotational direction. A drum 9 is inserted with the top portion of the rotational shaft 2 from an outside of the rotational shaft 2 and is fixed in the vicinity of or at the top portion of the rotational shaft 2. The drum 9 alternately winds a pair of wires W1 and W2 so as to implement an opening operation and a closing operation of the sliding door (not shown). According to the embodiment of the present invention, the rotor 3 and the armature 6 are made of magnetic material.

Figure 2:
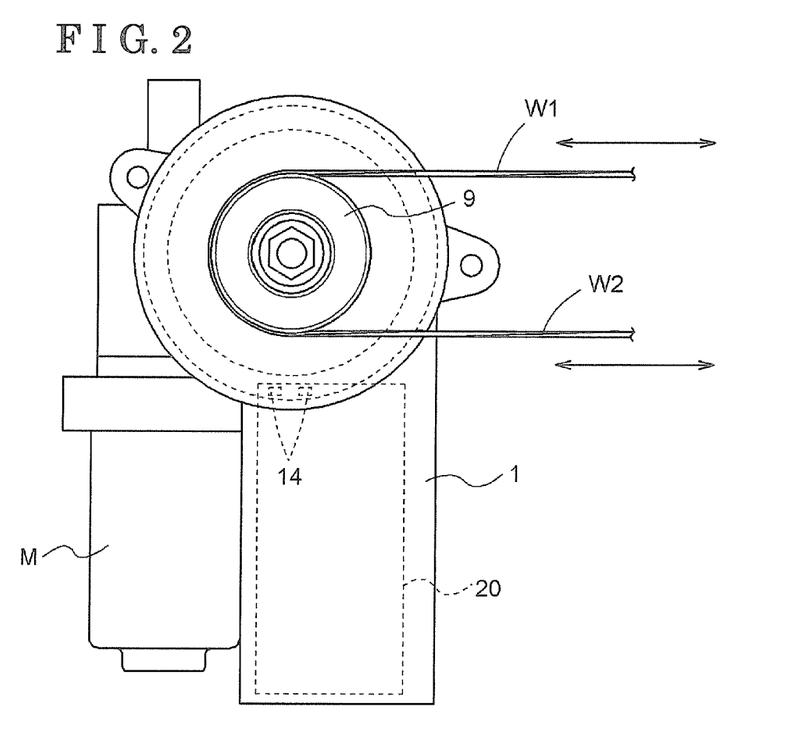
FIG. 2 is a plan view of the electromagnetic clutch apparatus according to the embodiment of the present invention.

FIG. 2 is a plan view of the electromagnetic clutch apparatus shown in FIG. 1. More specifically, FIG. 2 shows an electric motor M for transmitting the rotational driving force to the worm gear 8. The armature 6 is supported by the wheel gear 7 so as to be shifted along a direction of the axis X within a range between a first position and a second position. In the first position, the armature 6 is slidable relative to a frictional surface 3a of the rotor 3. In the second position, the armature 6 is in contact with the frictional surface 3a of the rotor 3.

A storage recess (i.e., a storage portion) is formed partially at the frictional surface 3a of the rotor 3. The storage recess opens upwardly and stores, therein, an annular exciting coil 4 for generating magnetic flux winded around a bobbin. Therefore, the rotor 3 according to the embodiment of the present invention includes the rotor main body attracting the armature 6 and a core housing therein the exciting coil 4. According to a conventional work, a core is provided separately from a rotor main body. However, according to the embodiment, the core is formed integrally with the rotor main body. Further, a peripheral surface of the rotor 3 exhibits a single cylindrical shape so that the magnetic flux is prevented from leaking from a side surface of a stepped structure to the outside of the rotor 3. In other words, a peripheral portion 3b of the rotor 3 does not include a stepped structure and flatly extends along the direction of the axis X and along a circumferential direction.

Figure 4:
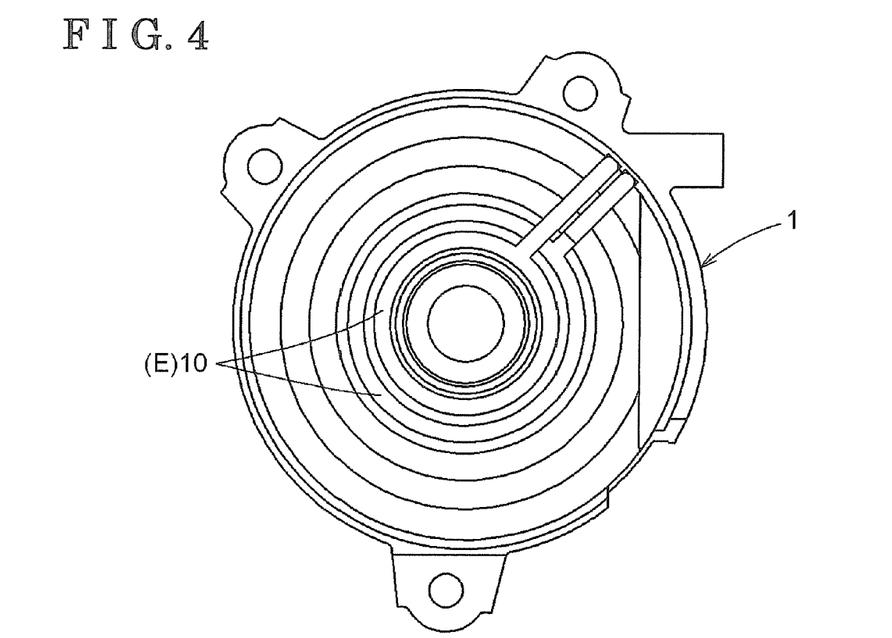
FIG. 4 is a plan view showing a slip ring of the electromagnetic clutch apparatus according to the embodiment of the present invention.
Figure 5:
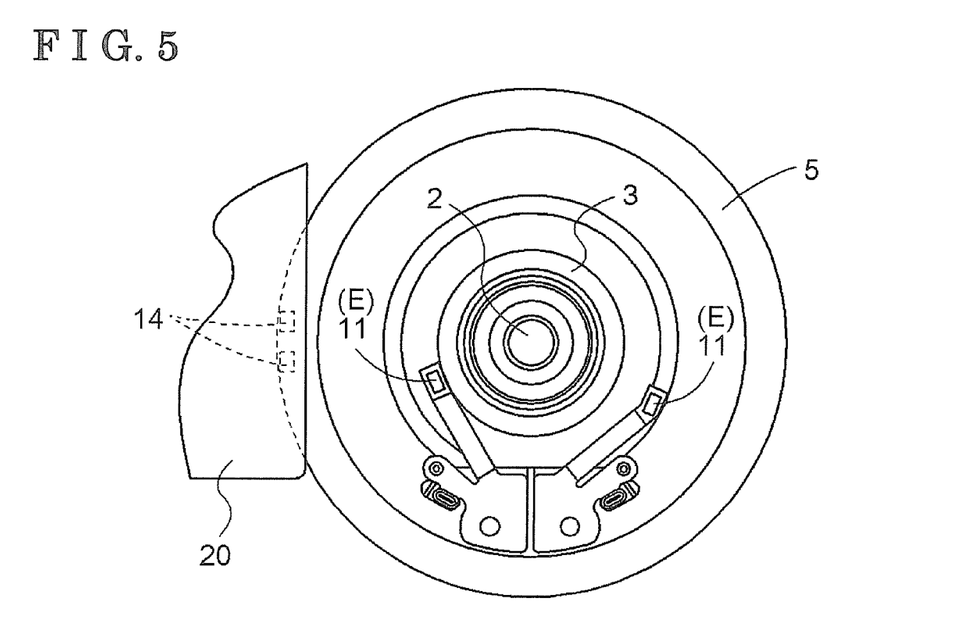
FIG. 5 is a bottom view showing a brush of the electromagnetic clutch apparatus according to the embodiment of the present invention.

As illustrated in FIGS. 4 and 5, a power feeding mechanism E for feeding excitation current to the exciting coil 4 includes two slip rings 10, which are provided at a bottom surface of the housing 1, and a pair of brushes 11, which is electrically in contact with the slip rings 10 when the exciting coil 4 is applied with current and is provided at a lower surface of the rotor 3. The brushes 11 are connected to both ends of the exciting coil 4, respectively.

When the exciting coil 4 is fed with the excitation current through the power feeding mechanism E, a magnetic field is generated around the exciting coil 4. In consequence, the rotor 3 and the armature 6 are magnetized and a magnetic attraction power is generated between the frictional surface 3a of the rotor 3 and the armature 6. The rotor 3 and the armature 6 attracted to each other are integrally rotated and a rotational force of the rotor 3 is transmitted to the drum 9 through the rotational shaft 2. Accordingly, the opening operation and the closing operation of the sliding door by the electric motor M can be performed. In contrast, when the feeding to the exciting coil 4 is stopped, the magnetic attraction power between the frictional surface 3a of the rotor 3 and the armature 6 is released and relative rotation of the rotor 3 and the armature 6 is allowed. Accordingly, a manual opening operation and a manual closing operation of the sliding door can be performed.

Figure 3:
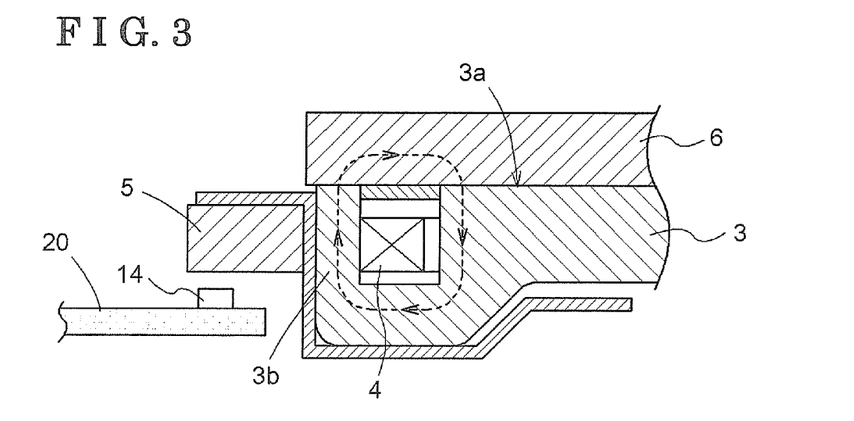
FIG. 3 is an enlarged view of a main section of the electromagnetic clutch apparatus shown in FIG. 1.
Figure 6B:
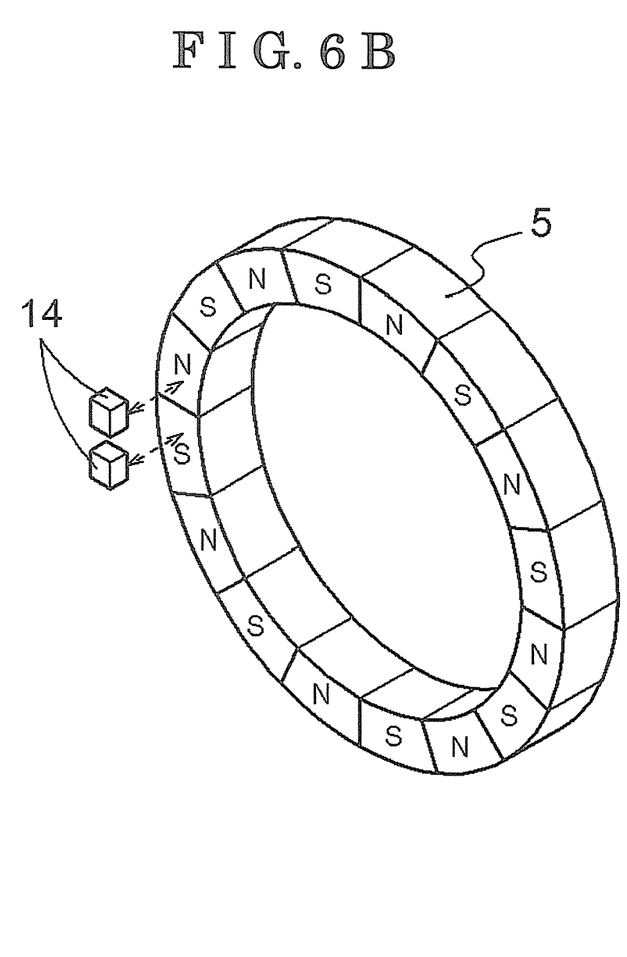
FIG. 6B is a schematic view showing a position of a hall element according to the embodiment of the present invention.

Plural magnetic poles 5 are arranged along the peripheral surface of the rotor 3 for determining a rotational direction and a rotational speed of the rotor 3. More specifically, an annular magnetic material is repeatedly magnetized as a magnet having north poles and south poles arranged alternately, so that the magnetic poles 5 having a north or south polarity are produced. The first housing portion 1' is provided with a pair of hall elements 14 (an example of a magnetic flux detecting element) for detecting the magnetic flux generated from the magnetic pole 5. On the basis of the rotational direction and/or the rotational speed of the rotor 3, a position of the sliding door, a sliding speed of the sliding door relative to the vehicle, and the like, are monitored. As illustrated in FIGS. 3 and 6B, according to the electromagnetic clutch apparatus, the poles 5 are firmly attached to the lower surface of a flange 3c of the rotor 3, which flange 3c extends radially outwardly from an upper end, or the vicinity, of a rotor case 31 of the rotor 3. At the lower surface of the flange 3c, the magnetic poles 5 (each of the magnetic poles 5 having a first polarity N and a second polarity S) are arranged alternately along the circumferential direction. The hall element 14 is arranged to face the magnetic poles 5 along the direction of the axis X.

The rotor 3 of the electromagnetic clutch apparatus according to the embodiment of the present invention is an integral structure of the rotor and the core, which both are provided separately in a conventional electromagnetic clutch, and the rotor 3 includes the storage recess portion, which stores the exciting coil 4 therein. Therefore, the magnetic flux generated by the exciting coil 4 flows within the region in the rotor 3, as illustrated in FIG. 3, and the magnetic flux less or rarely leaks to the outside of the rotor 3. Accordingly, an influence of leaked magnetic flux relative to the hall element 14 (i.e., the magnetic flux detecting element) can be reduced. Further, because the hall element 14 face the magnetic poles 5 along the axial center X, a separate auxiliary substrate for the hall element 14 is not required and the hall element 14 can be provided at an electromagnetic clutch control substrate 20 (i.e., a control substrate). More specifically, two hall elements 14 are provided at a side portion of the planar electromagnetic clutch control substrate 20.

According to the embodiment of the present invention, the exciting coil 4 is provided so as to integrally rotatable with the rotor 3. However, the present invention is not limited thereto. Alternatively, the exciting coil 4 may be fixed to the housing 1.

According to the embodiment of the present invention, the electromagnetic clutch apparatus includes the worm gear 8. However, the present invention is not limited thereto. Alternatively, the electromagnetic clutch apparatus may include a pinion gear having relatively large amount of teeth. In such a structure, the rotational shaft performs an output of the rotational driving force and the wheel gear performs an input of the rotational driving force.

According to the embodiment of the present invention, the electromagnetic clutch apparatus is applied to the sliding door for the vehicle. However, the present invention is not limited thereto. Alternatively, the electromagnetic clutch apparatus may be applied to a door opening and closing operation system configured to selectively establish an automatic operation mode and a manual operation mode. The system is represented by a power swing door system, a power back door system, and the like. In the automatic operation mode, a door is automatically opened and closed by means of a driving source such as a motor. In the manual operation mode, the door is manually opened and closed. According to the embodiment of the present invention, the electromagnetic clutch apparatus is applied to the vehicle. However, the present invention is not limited thereto. Alternatively, the electromagnetic clutch apparatus may be applied to any system capable of switching an automatic operation mode, in which a driven portion is automatically operated by means of a driving force, and a manual operation mode, in which the driven portion is manually operated.

Figure 7:
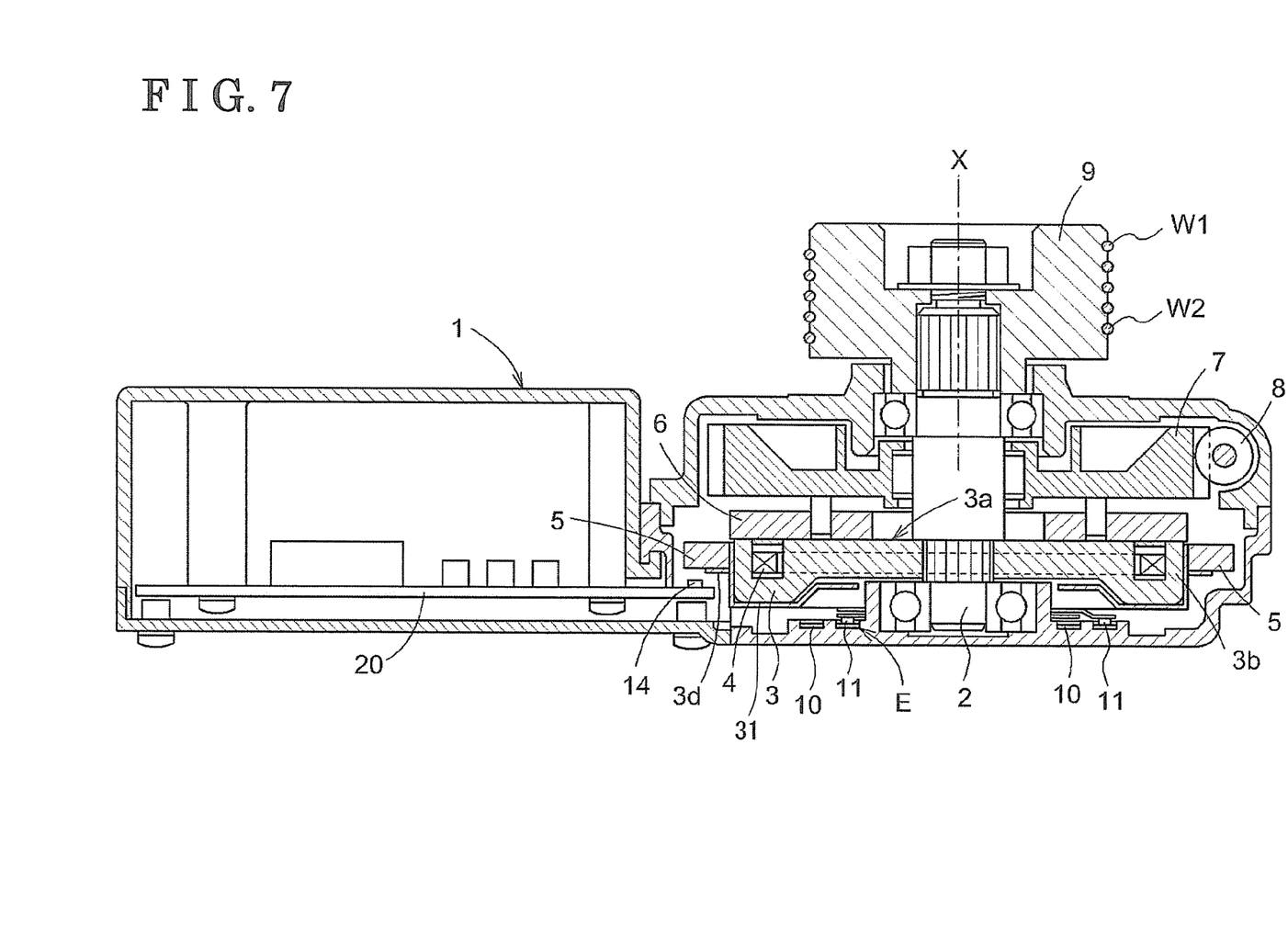
FIG. 7 is a broken side view of an electromagnetic clutch apparatus according to a variation of the present invention.

As illustrated in FIG. 7, a magnet may be provided at an upper side surface of a flange $3d$ radially-outwardly extending from the rotor case 31 arranged at the vicinity of an intermediate portion of the rotor 3 along the axis X. So configured, the magnet can easily be replaced with an annular magnet having different thickness and magnetic force along the axial direction without changing a distance from the hall element 14 (i.e., the magnetic flux detecting element).

With the configuration of the electromagnetic clutch apparatus according described above, the exciting coil 4 is stored in the rotor 3. Therefore, air gap is not easily generated and the magnetic flux is prevented from leaking to the outside of the rotor 3. In consequence, even when the hall element 14 faces the magnetic pole 5 along the axial direction, the hall element 14 is less likely to be influenced by the leaked magnetic flux. Accordingly, the hall element 14 is not required to be arranged in a radial direction and flexibility of an arrangement of the magnetic flux is obtained. Further, there is no need to separately provide the electromagnetic clutch control substrate 20 and the magnetic flux detecting element substrate in order to prevent the magnetic flux from leaking because of an air gap between the rotor main body and the core. Therefore, the electromagnetic clutch control substrate 20 and the magnetic flux detecting element substrate is shared and a manufacturing cost of the electromagnetic clutch apparatus is reduced.

With the configuration of the electromagnetic clutch apparatus according to the embodiment of the present invention, the rotor 3 includes the rotor main body. The frictional surface $3a$, which electromagnetically attracts the armature 6, and a storage portion, which stores the exciting coil 4 therein, are integrally formed to construct the rotor main body. The storage recess portion for storing the exciting coil 4 is provided in the rotor 3 at the armature side.

With the configuration of the electromagnetic clutch apparatus according to the embodiment of the present invention, air gap is less likely to be generated between the rotor and the core, compared with a conventional structure in which a core housing an exciting coil is separately provided from the rotor main body having the attraction surface. Therefore, the influence of the leaked magnetic flux relative to the hall element 14 can be reduced or can be reduced possibly to zero.

According to the embodiment of the present invention, the peripheral surface of the rotor 3 exhibits a single cylindrical shape.

With such a configuration, the air gap is furthermore less likely to be generated.

According to the embodiment of the present invention, the hall element 14 is provided at the electromagnetic clutch control substrate 20.

With the configuration of the electromagnetic clutch apparatus according to the embodiment of the present invention, there is no need to separately provide the electromagnetic clutch control substrate 20 and the magnetic flux detecting element substrate. Therefore, a material cost, a process of an assembling, and a size of the electromagnetic clutch apparatus can be reduced.

According to the embodiment of the present invention, the electromagnetic clutch apparatus includes the power feeding mechanism E for feeding excitation current to the exciting coil 4. The power feeding mechanism E is provided with the brush 11 electrically connected to the exciting coil 4 and the slip ring 10 on which the brush 11 is slidable.

With the configuration of the electromagnetic clutch apparatus according to the embodiment of the present invention, there is little chance of dragging a harness when the core itself is rotated relative to a condition in which the rotor and the core are separately provided and the power feeding mechanism E is made by the harness connected to the core. Further, with the configuration of the electromagnetic clutch apparatus according to the embodiment of the present invention, there is little chance of cutting off a cable when the cable is wound or rewound relative to a condition in which the power feeding mechanism E is made by a flexible cable.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. An electromagnetic clutch apparatus, comprising:
a rotational shaft rotatable to implement either one of an input and an output of a rotational driving force;
a rotor integrally rotated with the rotational shaft about an axis and provided with a plurality of magnetic poles each having a first polarity and a second polarity being different from the first polarity, the first and second polarities of the magnetic poles being arranged alternately along a circumferential direction of the rotor;
an armature supported to be rotatable relative to the rotor;
a rotational member rotated to implement the other of the input and the output of the rotational driving force relative to the armature;
an exciting coil stored in the rotor and generating magnetic flux so that the rotor electromagnetically attracts the armature;
a housing possessing a first housing portion and a second housing portion, the first housing portion accommodating the rotational member, the rotor, the armature and the rotational shaft; and
a magnetic flux detecting element arranged to face the magnetic poles along a direction of the axis so as to detect magnetic flux of the magnetic poles, the magnetic flux detecting element being mounted on a clutch control substrate which extends into the first housing portion along a radial direction of the rotational shaft so that one portion of the clutch control substrate on which is mounted the magnetic flux detecting element is positioned inside the first housing portion and an other portion of the clutch control substrate is positioned outside the first housing portion.

2. An electromagnetic clutch apparatus according to claim 1, wherein
the rotor further comprises a rotor main body having:
an attraction surface electromagnetically attracting the armature; and
a storage recess portion provided at the armature side of the rotor main body for storing the exciting coil and formed integrally with the attraction surface.

3. An electromagnetic clutch apparatus according to claim 2, wherein a peripheral surface of the rotor exhibits a single cylindrical shape.

4. An electromagnetic clutch apparatus according to claim 3, wherein the electromagnetic clutch apparatus further comprises a power feeding mechanism for feeding excitation current to the exciting coil, the power feeding mechanism includes a brush electrically connected to the exciting coil and a slip ring on which the brush is slidable.

5. An electromagnetic clutch apparatus according to claim 2, wherein the electromagnetic clutch apparatus further comprises a power feeding mechanism for feeding excitation current to the exciting coil, the power feeding mechanism includes a brush electrically connected to the exciting coil and a slip ring on which the brush is slidable.

6. An electromagnetic clutch apparatus according to claim 1, wherein the electromagnetic clutch apparatus further comprises a power feeding mechanism for feeding excitation current to the exciting coil, the power feeding mechanism includes a brush electrically connected to the exciting coil and a slip ring on which the brush is slidable.

7. An electromagnetic clutch apparatus according to claim 1, wherein the clutch control substrate has a surface facing a surface of the rotor along a direction orthogonal to the direction of the axis.

8. An electromagnetic clutch apparatus, comprising:
a rotational shaft rotatable to implement either one of an input and an output of a rotational driving force;
a rotor integrally rotated with the rotational shaft about an axis and provided with a plurality of magnetic poles each having a first polarity and a second polarity being different from the first polarity, the first and second polarities of the magnetic poles being arranged alternately along a circumferential direction of the rotor;
an armature supported to be rotatable relative to the rotor;
a rotational member rotated to implement the other of the input and the output of the rotational driving force relative to the armature;
an exciting coil stored in the rotor and generating magnetic flux so that the rotor electromagnetically attracts the armature;
a housing possessing a first housing portion and a second housing portion, the first housing portion accommodating the rotational shaft, the rotor, the armature and the rotational member;
a clutch control substrate having one portion positioned inside the second housing portion and having an extension that extends into the first housing portion along a radial direction of the rotational shaft so that the extension is positioned inside the first housing portion; and
a magnetic flux detecting element facing the magnetic poles along a direction of the axis to detect magnetic flux of the magnetic poles, the magnetic flux detecting element being mounted on the extension of the clutch control substrate that is positioned inside the first housing portion.

9. An electromagnetic clutch apparatus according to claim 8, wherein the rotor further comprises a rotor main body having:
an attraction surface electromagnetically attracting the armature; and
a storage recess portion in which is stored the exciting coil, the storage recess being formed integrally with the attraction surface and being provided on a side of the rotor main body at which is located the armature.

10. An electromagnetic clutch apparatus according to claim 9, wherein a peripheral surface of the rotor exhibits a single cylindrical shape.

11. An electromagnetic clutch apparatus according to claim 8, wherein the electromagnetic clutch apparatus further comprises a power feeding mechanism for feeding excitation current to the exciting coil, the power feeding mechanism includes a brush electrically connected to the exciting coil and a slip ring on which the brush is slidable.

* * * * *